(12) United States Patent
Grande

(10) Patent No.: US 7,197,239 B1
(45) Date of Patent: Mar. 27, 2007

(54) SEAT DEWRINKLING METHOD AND APPARATUS

(75) Inventor: Michael L. Grande, East Troy, WI (US)

(73) Assignee: Wisconsin Oven Corporation, East Troy, WI (US)

( * ) Notice: Subject to any disclaimer, the term of this patent is extended or adjusted under 35 U.S.C. 154(b) by 0 days.

(21) Appl. No.: 10/918,309

(22) Filed: Aug. 13, 2004

(51) Int. Cl.
*F26B 3/30* (2006.01)
(52) U.S. Cl. ..................................................... 392/418
(58) Field of Classification Search ........ 392/411–418, 392/422–423; 34/270, 380, 103
See application file for complete search history.

(56) References Cited

U.S. PATENT DOCUMENTS 2,841,684 A * 7/1958 Miskella ..................... 392/415

OTHER PUBLICATIONS

Wisconsin Oven Corporation; Wisconsin Infrared Systems; 1996-1997; East Troy, Wisconsin; printed from http://wisintrared.com/ on Apr. 28, 2004.
Fostoria Industries, Inc.; Product Descriptions; 2002; Fostoria, Ohio; printed from http://www.fostoriaindustries.com/ on Apr. 28, 2004.
Mor Electric Heating Assoc., Inc.; Infrared Internationale of North America, Ltd.; Infrared Heating Basic Information; Dec. 4, 2003; Comstock, Park, Michigan; printed from http://www.infraredheaters.com/basic.htm on Apr. 28, 2004.
John J. Fannon Co.; Product Descriptions; printed from http://www.fannoninfrared.com/ on Apr. 28, 2004.

* cited by examiner

*Primary Examiner*—Robin Evans
*Assistant Examiner*—Vinod Patel
(74) *Attorney, Agent, or Firm*—Reinhart Boerner Van Deuren, S.C.

(57) ABSTRACT

A system and method for removing wrinkles from the covering material of seats for automobiles and other vehicles. The invention may be implemented in a seat dewrinkling oven that includes front and rear heaters that conform to the shape of the seat being heated. In particular, a front heater may be employed that includes a vertically oriented portion for directing heat at the vertically oriented back portion of a front seat surface and a horizontally oriented portion for directing heat at the horizontally oriented bottom portion of the seat front surface. Preferably medium wavelength infrared heating elements are employed in the heaters to provide better heat penetration and dewrinkling.

19 Claims, 4 Drawing Sheets

SEAT DEWRINKLING METHOD AND APPARATUS

FIELD OF THE INVENTION

The present invention pertains generally to industrial heating devices and methods, such as industrial ovens and methods for their use, and, more particularly, to ovens and other heating devices and methods for removing wrinkles from seat material applied to seats for automobiles and other vehicles.

BACKGROUND OF THE INVENTION

Typical seats for automobiles and other vehicles are formed on a metal frame to which padding is attached. The padding may typically be formed of a synthetic foam material that is covered with a natural or man made covering material. For example, the seat covering material may typically be leather, vinyl, or some type of cloth. The covering material may be applied to the seat by attaching the covering material over the foam padding either prior to or after attaching the padding to the seat frame or by stuffing the padding into the covering material before attaching the padding to the seat frame.

A very common problem associated with seats constructed in the manner just described is that, immediately after assembling the seat, the seat covering material is often wrinkled. This wrinkled appearance is very unacceptable to purchasers of the vehicles in which the seats are installed. Purchasers desire to see smooth wrinkle free seat surfaces.

It has been found that the wrinkles appearing in seat covering material may be removed by heating the seat covering material at a relatively high temperature for a short duration. If the right temperature and time of exposure is applied, heat can be used to remove wrinkles from the seat covering material without scorching or otherwise damaging the seat material. A typical device employed by manufacturers to apply such heat to a seat for removing wrinkles from the covering material thereof is a seat dewrinkling oven or, in short, a seat oven.

A conventional seat oven 10 is illustrated in, and will be described with reference to, FIG. 1. The conventional seat oven 10 typically is formed in an enclosure 12, which may, for example, include insulated walls 14 to keep the heat generated by the oven contained therein. At least one side 16, and preferably two opposed sides, of the oven 10 are open, or openable, to allow a seat 18 to be placed therein for dewrinkling. The oven 10 typically includes some kind of support structure 20 for supporting the seat 18 within the oven 10. The support structure 20 may, for example, be part of a conveyor system for both supporting the seat 18 within and transporting the seat 18 through the oven 10.

A typical seat 18 for an automobile or other vehicle has a generally vertically oriented rear surface 22 and a front surface 24. The front surface 24 of the seat 18 forms the part of the seat that is sat upon. The front surface 24 of the seat 18 thus comprises a generally vertically oriented back portion 26 and a generally horizontally oriented bottom portion 28. The junction point 30 between the back portion 26 and the bottom portion 28 of the front surface 24 of the seat 18 is commonly known as the seat bight.

A conventional seat oven 10 typically employs two heaters: a generally vertically oriented rear heater 32, for applying heat to the vertically oriented rear surface 22 of the seat 18, and a front heater 34. Both the rear 32 and the front 34 heaters typically may be formed of a plurality of generally horizontally and parallel arranged infrared heating elements 36 (e.g., rods or lamps) that generate short wave infrared radiation (e.g., generally in the wavelength range of 0.75–2 microns). The heating elements 36 may be mounted within parabolic or other reflectors 38 to enhance the heat radiation that is directed from the heaters 32 and 34 toward the seat 18.

As illustrated in FIG. 1, the front heater 34 as employed in a conventional seat dewrinkling oven 10 presents a substantially planar heating surface that is typically positioned in front of and above the front surface 24 of the seat 18 to direct the infrared energy generated thereby down onto the front surface 24 of the seat 18. With this conventional type of heater 34, distances of the various parts of the front surface 24 of the seat 18 from the heating surface vary significantly. With this configuration, for example, the front heater 34 is positioned very close to a top of the back portion 26 of the front surface 24 and a front of the bottom portion 28 of the front surface 24 of the seat 18. The seat bight 30, in contrast, is positioned much further away from the front heater 34. Thus, using this conventional configuration, the heat applied to the front surface 24 of the seat is not even across the surface thereof. Sufficient heat intensity, and the duration of application thereof, must be applied by the front heater 34 to remove wrinkles from the seat 18 at and around the seat bight 30, which is far removed from the heater 34. However, in a conventional seat oven, such applied heat, and the duration of application thereof, needed to remove wrinkles from the seat 18 near the bight 30 may be more than is required to remove wrinkles from the portions of the front surface 24 of the seat 18 that are more closely positioned relative to the heater 34.

What is desired, therefore, is a method and apparatus for applying heat to the covering material of a seat for an automobile or other vehicle in a manner such that the heat is applied evenly over the surface of the seat thereby to remove wrinkles from the seat covering material in a time and energy efficient manner.

SUMMARY OF THE INVENTION

The present invention provides an improved system and method for dewrinkling the covering material used on seats for automobiles and other vehicles. The present invention may be implemented in a seat dewrinkling oven employing heaters that are positioned within the oven so as to be contoured to the shape of the seat surfaces to be heated. Thus, in accordance with the present invention, heat is applied evenly to the seat covering material, thereby to remove wrinkles therefrom in a reduced amount of time and employing a reduced amount of energy, while thereby also reducing the risk of damage to the seat during the heating process. Preferably the heaters employed in accordance with the present invention may be adjustable in position to allow a seat dewrinkling oven in accordance with the present invention to be used to remove wrinkles from seats having a variety of seat shapes. A seat oven in accordance with the present invention preferably employs infrared heating elements which provide medium-wavelength infrared energy, e.g., generally in the range of 2–4 microns, which has been found to be more effective for removing wrinkles from a variety of different seat covering materials.

Further objects, features, and advantages of the present invention will be apparent from the following detailed description taken in conjunction with the accompanying drawings.

DETAILED DESCRIPTION OF THE DRAWINGS

DETAILED DESCRIPTION OF THE INVENTION

Figure 1:
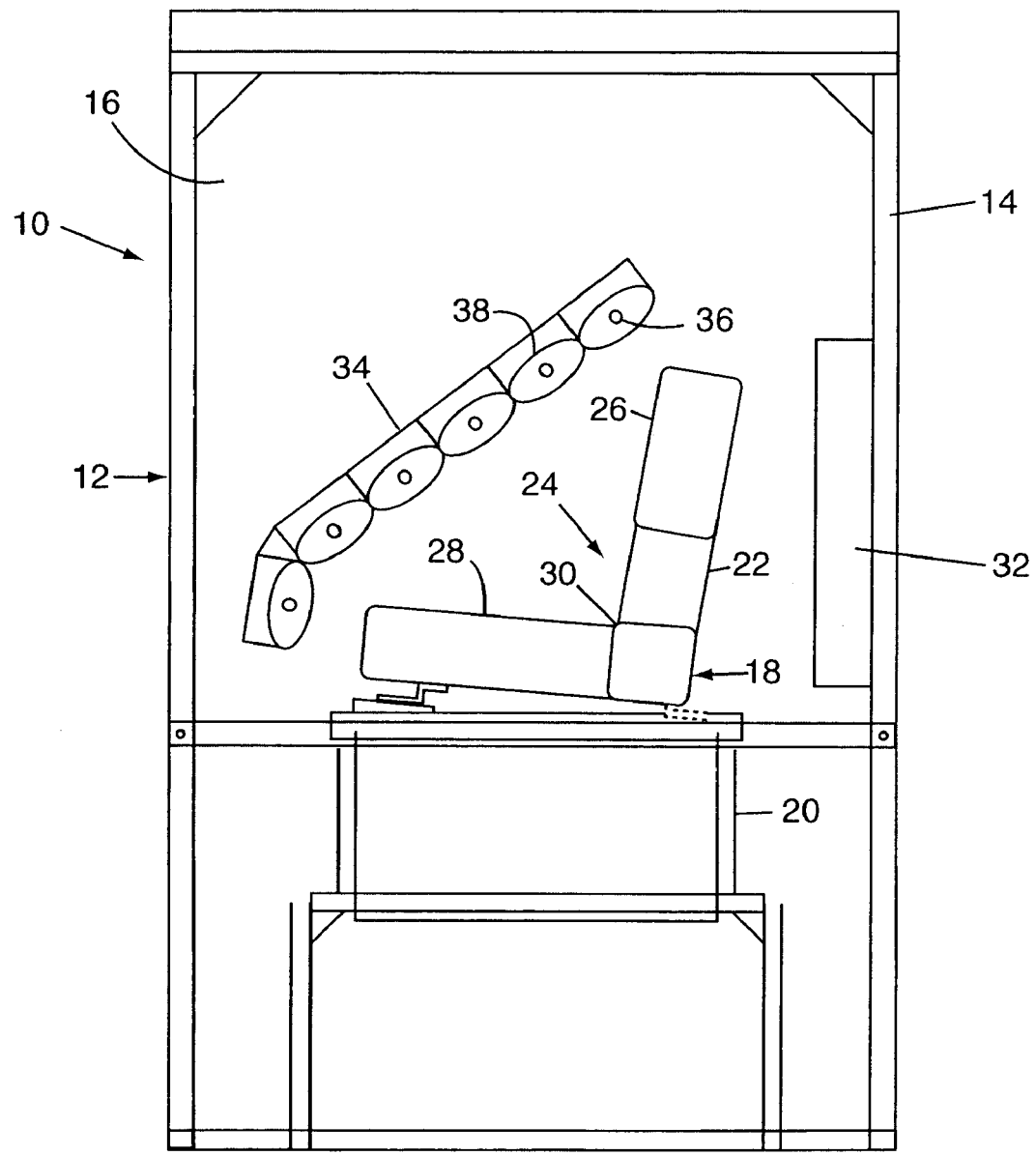
FIG. 1 is a side view of a conventional seat dewrinkling oven as known in the prior art.

The present invention will be described in detail with reference to the illustration in FIG. 2 of an exemplary seat dewrinkling oven 40 in accordance with the present invention. The seat dewrinkling oven 40 in accordance with the present invention preferably includes a housing or other support structure 42 within which the other components of the oven are enclosed or to which the other components of the oven are attached. The housing structure 42 preferably may be of high strength tubular construction, e.g., using high strength tubular steel components, such that the enclosure structure 42 is easily assembled in position at a desired location while providing sufficient strength and durability to support the other components of the oven 40 as well as one or more seats 18 that are placed in the oven 40 for dewrinkling.

At least two walls 44 and 46 of the support structure 42 may be enclosed and insulated to retain heat generated by the oven 40 within the oven. A box 48 or other structure containing the controls for the oven 40 preferably may be mounted to one of the closed insulated walls 44 of the oven 40. The insulated wall 44 in this case also provides protection of the controls 48 from the heat generated within the oven 40.

At least one side 50 of the oven may be open, or openable, to allow one or more seats 18 to be placed therein for dewrinkling. Preferably opposed sides of the oven 40 may be open or openable to allow seats 18 to be passed through the oven 40 from one side thereof to the other for dewrinkling therein.

A seat support structure 52 preferably is provided within the oven 40 to support and maintain a seat 18 in the desired position within the oven 40 during the dewrinkling process. This seat support structure 52 may include or be part of a conventional conveyor system whereby seats 18 may be supported within and conveyed through the oven 40 for dewrinkling in the manner to be described below.

A seat dewrinkling oven in accordance with the present invention preferably includes a rear heater 54 and a front heater 56. The rear heater 54 is positioned within the oven 40 to direct heat at the rear surface 22 of a seat 18 to remove wrinkles from the covering material thereof. The front heater 56 is positioned within the seat dewrinkling oven 40 to direct heat at the front surface 24 of the seat 18 to remove wrinkles from the covering material thereof. In accordance with the present invention, the rear 54 and front 56 heaters are positioned and shaped so as to direct heat evenly across the surfaces of the seat 18 from which wrinkles are to be removed, thereby to remove the wrinkles in a time and energy efficient manner.

The rear heater 54 is generally vertically oriented within the seat dewrinkling oven 40, thereby to direct heat at the generally vertically oriented rear surface 22 of a seat 18. The rear heater 54 may be mounted in a position within the seat dewrinkling oven 40 by attaching the rear heater 54 to the oven support structure 42. For example, the rear heater 54 may be mounted to the housing support structure 42 via one or more generally horizontally oriented supports arms 58 that are bolted or otherwise attached to the support structure 42 to extend therefrom into the oven 40.

The rear heater 54 preferably may be mounted within the seat dewrinkling oven 40 such that the distance and/or orientation thereof with respect to the seat 18 to be heated is adjustable. For example, the one or more support arms 58 to which the rear heater 54 is mounted may include a horizontally oriented slot or track 60. The rear heater 54 is attached to the support arm 58 via a threaded rod or bar attached to the heater 54 and extending through or into the one or more slots or tracks 60 such that the rear heater 54 can be moved in position horizontally along the slot or track 60 and rotated in position with respect to an axis of rotation extending through the slot or track 60. A hand operated knob 62 or other similar structure may be employed to fix the rear heater 54 in position with respect to the mounting arm 58 when the desired position and orientation for the rear heater 54 is established.

Figure 3:
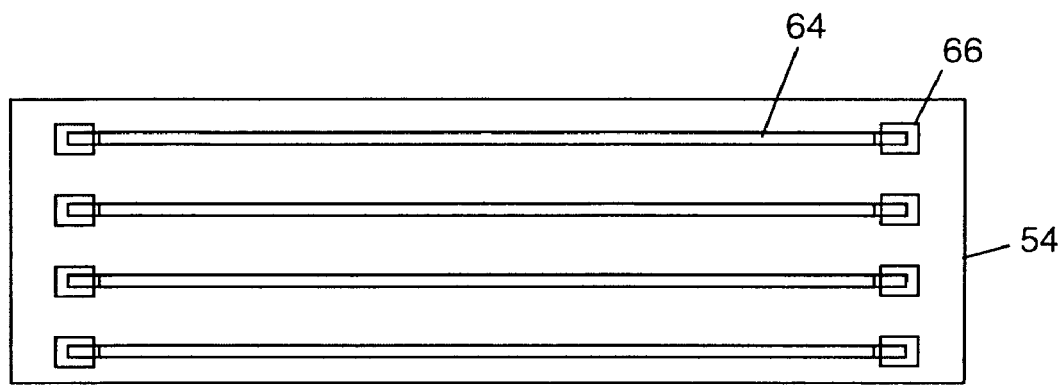
FIG. 3 is an illustration of the rear heater of the exemplary seat dewrinkling oven in accordance with the present invention illustrated in FIG. 2 as taken along line 3—3 thereof.

The rear heater 54 preferably includes a plurality of heating elements 64. (See FIG. 3) The heating elements employed preferably are elongated rod shaped heating elements 64, a plurality of which are mounted parallel with each other in a generally horizontal orientation to form the rear heater 54. Preferably, infrared heating elements 64 that provide primarily medium-wave infrared energy, e.g., in a wave length range of approximately 2–4 microns, are employed. Exemplary heating elements 64 of this type include the Fannon Goldenrod medium-wavelength infrared lamps. These heating elements include gold internal reflectors, thereby eliminating the need to use external reflectors as part of the rear heater 54. The individual heating elements 64 preferably may be attached to the rear heater 54 via high quality insulated ceramic terminals 66, that provide for easy removal and replacement of the heating elements 64 employed.

The front heater 56 employed in a seat dewrinkling oven 40 in accordance with the present invention preferably includes a generally vertically oriented portion 68 thereof and a generally horizontally oriented portion 70 thereof. The generally horizontally oriented portion 70 of the front heater 56 is positioned with respect to the generally vertically oriented portion 68 thereof such that the vertically 68 and horizontally 70 oriented portions of the front heater 56 form the complimentary shape to the front surface 24 of a seat 18. Thus, the shape of the front heater 56 is contoured to the shape of the front surface 24 of the seat, thereby heating the front surface 24 of the seat 18 evenly to remove wrinkles therefrom.

The front heater 56 may be mounted within the oven 40 via a mounting structure attached to the oven support structure 42 that allows a variety of adjustments of the position and orientation of the front heater 56 within the oven 40 and thus with respect to the seat 18. For example, a mounting structure 72 attached to the oven support structure 42 may include a horizontal track to which a telescoping vertical support arm 74 is moveably attached. The front heater 56 preferably may be rotatably attached to the telescoping vertical support arm 74 at an end thereof opposite the end of the telescoping vertical support arm 74 that is moveably attached to the horizontal track mounting structure 72. Thus, the telescoping vertical support arm 74 may be moved along the horizontal track mounting structure 72 to adjust the horizontal position of the front heater 56 within the oven and with respect to a seat 18. The telescoping vertical support arm 74 may be extended or retracted to adjust the vertical position of the front heater 56 within the oven and with respect to a seat 18. The front heater 56 may be rotated with respect to the telescoping vertical support arm 74 to which it is attached to adjust the orientation of the front heater 56 with respect to the seat 18. A hand operated knob 76 or other similar structure may be employed to fix the front heater 56 in rotational position when the desired orientation for the front heater 56 is established.

The angle of the vertical portion 68 of the front heater 56 with respect to the horizontal portion 70 thereof, and vice versa, preferably may be adjustable as well. This allows for the shape and orientation of the front heater 56 to be adjusted to accommodate the shape of the front surfaces 24 a variety of seats 18. For example, the horizontal portion 70 of the front heater 56 may be joined to the vertical portion 68 thereof at a moveable hinge 78 or similar structure. Thus, the horizontal portion 70 may be moved with respect to the vertical portion 68 of the front heater 56 about the hinge 78 to adjust the angle between the two portions 68 and 70 to correspond to the angle between the back portion 26 and bottom portion 28 of the front surface 24 of a seat to be heated using the front heater 56. A hand operated knob 79 and/or other appropriate structure may be employed to fix the angular position of the horizontal portion 70 of the front heater 56 with respect to the vertical portion 68 thereof when the desired angle between the two portions 68 and 70 is established.

Figure 4:
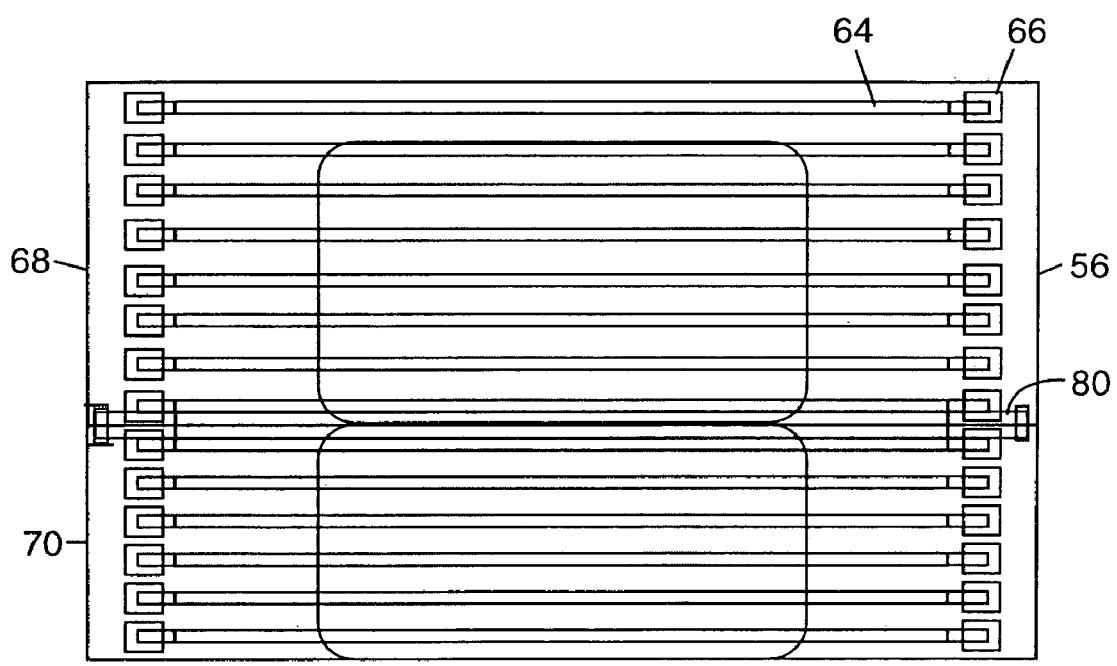
FIG. 4 is an illustration of the front heater of the exemplary seat dewrinkling oven in accordance with the present invention illustrated in FIG. 2 as taken along line 4—4 thereof.

Both the vertical 68 and horizontal 70 portions of the front heater 56 may include a plurality of generally horizontally oriented elongated heating elements 64 mounted parallel to each other. (See FIG. 4) Preferably medium-wavelength tubular infrared heaters are employed in the front heater 56, as described above with respect to the rear heater 54. As with the rear heater 54, the heating elements 64 preferably may be attached to the front heater 56 via high quality insulated ceramic terminals 66, that provide for easy removal and replacement of the heating elements 64 employed.

To provide adequate heating to remove wrinkles from the front surface 24 of the seat 18 in and around the seat bight 30, the front heater 56 may include one or more heating elements 80 that are positioned at the transition or corner formed between the vertical 68 and horizontal 70 portions of the front heater 56. Such bight heating elements 80 ensure even heating across the front surface 24 of the seat, including of the seat bight 30. Note that the bight heating elements 80 may project forward from the planes of heating elements of the vertical portion 68 and/or horizontal portion 70 of the front heater 56, thereby to project heat better into the seat bight 30.

Figure 5:
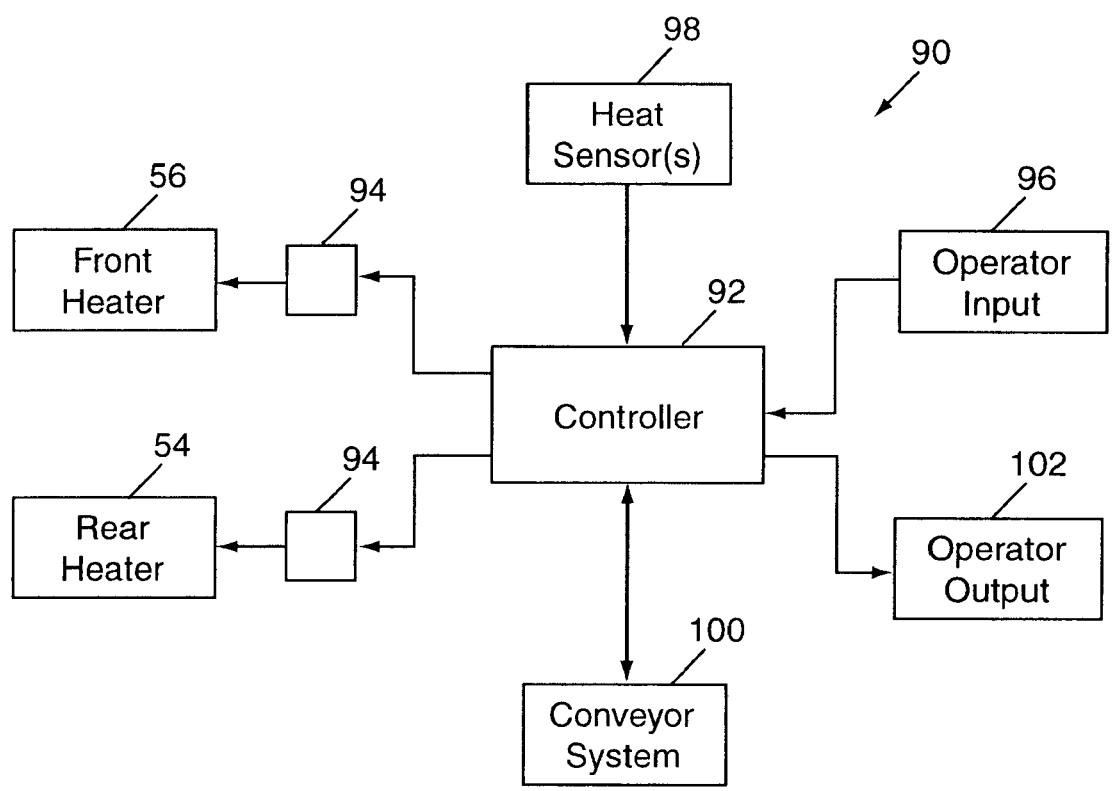
FIG. 5 is a schematic block diagram of an exemplary control system for controlling the heaters of a seat dewrinkling oven in accordance with the present invention.

The front 56 and rear 54 heaters preferably may be controlled by a control system. An exemplary control system 90 that may be employed in a seat dewrinkling method and apparatus in accordance with the present invention is illustrated in FIG. 5, and will be described with reference thereto. It should be understood that control systems other than the exemplary control system 90 to be described, including conventional control systems, may be employed in a seat dewrinkling method and apparatus in accordance with the present invention.

The exemplary control system 90 may include a controller 92 that may be implemented using conventional electronic circuitry, such as one or more microprocessors, microcontrollers, or other programmable devices and/or using discrete digital and/or analog circuitry. The controller 92 generates control signals that are provided, via appropriate heater controllers/drivers 94, to control operation of the heating elements 64 of the front 56 and rear 54 heaters. Independent control preferably is provided for each of the front 56 and rear 54 heaters. Individual heating elements 64 or groups of heating elements 64 within the heaters 56 and 54 may also be independently controlled by the controller 92. For example, the heating elements 64 in the vertical portion 68 and horizontal portion 70 of the front heater 56 may be controlled independently from each other as well as from the bight heating elements 80. Such independently controlled heating zones allow the right amount of heat to be provided to various portions of the seat 18 to remove wrinkles from the seat covering material effectively and rapidly without applying too much heat to any part of the seat 18.

The controller 92 provides control signals to control the heaters 54 and 56 to turn the heating elements 64 on and off at the desired times as well as to control the heater output, when the heating elements 64 are turned on, to a desired percentage of the maximum output of the heating elements 64. The desired heat output may be set manually by an operator, e.g., using an operator input device 96, such as a conventional dial and/or keypad input device coupled to the system controller 92. Alternatively, or additionally, the control system 90 may employ one or more heat sensors 98 to provide temperature feedback to the system controller 92 that the system controller 92 employs to control operation of the heating elements 64 in the heaters 54 and 56 to maintain a desired temperature range. For example, one or more pyrometers, such as optical pyrometers, may be mounted at appropriate positions in the oven 40, e.g., on the housing structure 42, to sense the temperatures at selected locations on the surface of a seat 18 being dewrinkled in the oven to provide the desired feedback to the system controller 92.

The control system 90 may be coupled to the control system of a conveyor system 100 for conveying seats 18 to be dewrinkled through the oven 40, thereby to coordinate control of the heaters 56 and 54 with operation of the conveyor system 100. A conveyor system 100 may convey seats 18 continuously through the oven 40 for dewrinkling. Alternatively, the conveyor system 100 may convey seats 18 into the oven 40, pause while the seat 18 is heated by the heaters 54 and 56 to remove wrinkles from the covering material thereof, and then convey the dewrinkled seat 18 out of the oven. (This "indexing" of seats 18 through the oven 40 may be required where pyrometers or other heat sensors 98 are used to sense the seat surface temperature to provide feedback to the system controller 92.) In the latter case, for example, the conveyor system 100 may provide a signal to the controller 92 to indicate that a seat 18 has been moved into the oven and is ready to be heated to remove wrinkles therefrom. Similarly, the controller 92 may provide a signal to the conveyor system 100 to indicate that the dewrinkling is complete and the seat 18 may be conveyed out of the oven 40.

The controller 92 may also provide indications, via one or more operator output devices 102, such as indicator lights, a display screen, etc., to an operator to indicate, e.g., proper system operation, system errors, heating times, temperatures detected by the heat sensors 98, etc.

As mentioned above, all heat sensitive components of the control system 90 may be mounted in an insulated box 48 or other enclosure that, in turn, is mounted on the oven support structure 42 outside of the oven.

Figure 2:
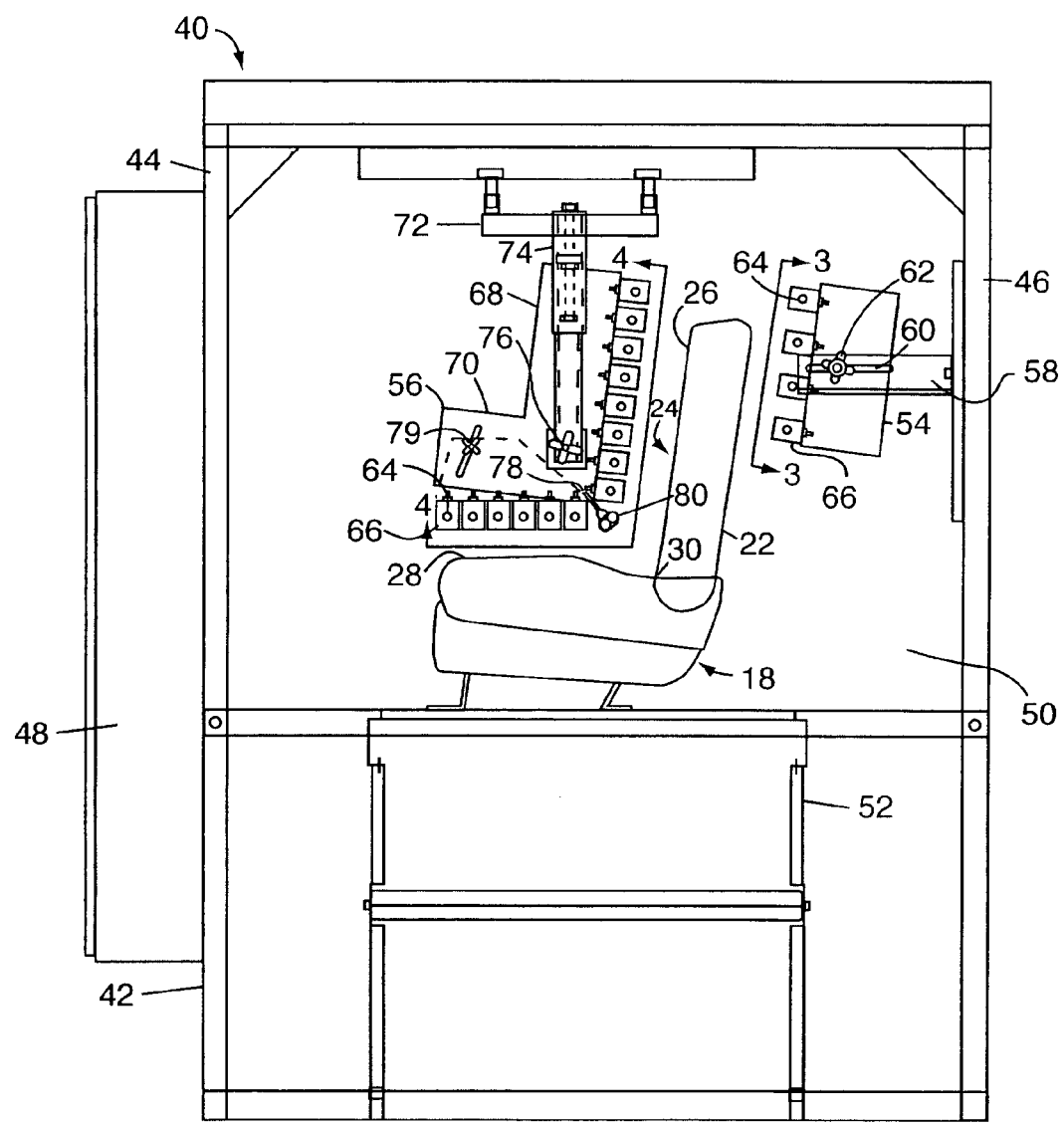
FIG. 2 is a side view of an exemplary seat dewrinkling oven in accordance with the present invention.

Experimentation has confirmed that the heating of seat covering material to remove wrinkles therefrom using medium wave infrared heaters and the heater configuration as illustrated in FIG. 2 is more effective than the use of short wave infrared heaters and a conventional heater configuration (FIG. 1). Tests were conducted using the two different configurations to heat a variety of different seat covering materials. The temperatures of the heated side and the back (unheated) side of the seat material were measured to determine the penetration of the heat through the material. It is generally recognized that good heat penetration of the seat covering material is required to provide for rapid and effective dewrinkling of the material.

A charcoal gray vinyl material was exposed for fifteen seconds using the medium wave infrared heaters with internal reflectors described herein and with the short wave heaters with external reflectors as commonly used in the prior art. (The heat density applied was the same.) With the medium wave heaters, the heated side of the covering material reached a temperature of 210° F., with the backside of the material reaching a temperature of 206° F., for a difference of only 4° F. In contrast, using the short wave heaters, with clean reflectors, the heated side of the seat material reached a temperature of 220° F. with the back side thereof reaching a temperature of 195° F., for a 25° difference. For short wave heaters with tarnished reflectors the heated side reached a temperature of only 145° F., with the backside of the material reaching a temperature of 122° F., for a difference of 23° F.

The same experiment was repeated with a light gray leather seat covering material that was exposed to heat for twenty five seconds. Using the medium wave internal reflector heaters described herein, the heated side of the material reached a temperature of 270° F. with the backside of the material reaching a temperature of 267° F., for a difference of 3° F. Using the short wave heaters with clean reflectors, the heated side of the covering material reached a temperature of 248° F., with the back side of the material reaching a temperature of 210° F., for a difference of 38° F. Using short wave heaters with tarnished reflectors the heated side of the covering material only reached a temperature of 173° F., with the back side of the material reaching a temperature of 147° F., for a difference of 26° F.

The experiment was repeated again with a black leather seat covering material, which was exposed to heat for twenty-seven seconds. Using the medium wavelength heaters with internal reflectors described herein the heated side of the material reached a temperature of 270° F., with the back side of the material reaching a temperature of 218° F., for a difference of 52° F. Using conventional short wave heaters with clean external reflectors the heated side of the material reached a temperature of 310° F., with the back side of the material reaching a temperature of 220° F., for a difference of 90° F. Using the short wave heaters with tarnished reflectors the heated side of the material reached a temperature of 195° F. with the back side of the material reaching a temperature of 143° F., for a difference of 52° F.

These experiments indicate that the back side of a seat covering material is heated consistently to a higher temperature using the medium wave internal reflector heaters described herein. This is true even though the average heat density (Watt/in$^2$) generated by the heaters is identical. The difference between the temperatures achieved on the heated and back sides of the covering material with the medium wavelength internal reflector heaters indicates that these heaters exhibit better penetration and, therefore, better dewrinkling characteristics than conventional short wave heaters.

It should be understood that the present invention is not limited to the particular exemplary applications and embodiments illustrated and described herein, but embraces all modified forms thereof as come within the scope of the following claims.

What is claimed is:

1. An apparatus for removing wrinkles from a seat covering material on a seat having a vertically oriented rear surface and a front surface having a vertically oriented back portion thereof and a horizontally oriented bottom portion thereof, comprising:
   (a) a vertically oriented front heater portion positioned substantially parallel with the vertically oriented back portion of the front seat surface such that a distance between the vertically oriented entire front heater portion and the vertically oriented entire back portion of the front seat surface is substantially constant across the vertically oriented back portion of the front seat surface to direct heat thereupon to remove wrinkles therefrom; and
   (b) a horizontally oriented front heater portion positioned substantially parallel with the horizontally oriented entire bottom portion of the front seat surface such that a distance between the horizontally oriented entire front heater portion and the horizontally oriented entire bottom portion of the front seat surface is substantially constant across the horizontally oriented bottom portion of the front seat surface to direct heat thereupon to remove wrinkles therefrom;
   wherein the vertically oriented front heater portion and horizontally oriented front heater portion are positioned with respect to each other at an angle corresponding to an angle between the vertically oriented back portion of the front surface of the seat and the horizontally oriented bottom portion of the front surface of the seat such that the vertically oriented front heater portion and the horizontally oriented front heater portion together conform to the shape of the front surface of the seat.

2. The apparatus of claim 1 wherein the angle between the horizontally oriented front heater portion and the vertically oriented front heater portion is adjustable.

3. The apparatus of claim 1 wherein the vertically and horizontally oriented front heater portions are mounted in an oven structure such that the positions of the vertically and horizontally oriented front heater portions are adjustable therein.

4. The apparatus of claim 1 comprising additionally a bight heater positioned between the vertically oriented front heater portion and the horizontally oriented front heater portion.

5. The apparatus of claim 4 wherein the vertically oriented front heater portion includes a plurality of heating elements in a first plane, the horizontally oriented front heater portion includes a plurality of heating elements in a second plane, and the bight heater includes at least one heating element in neither the first plane nor the second plane.

6. The apparatus of claim 1 wherein the vertically oriented front heater portion and the horizontally oriented front heater portion each include a plurality of heating elements.

7. The apparatus of claim 6 wherein the plurality of heating elements are elongated heating elements mounted parallel to each other within each of the vertically and horizontally oriented front heater portions.

8. The apparatus of claim 6 wherein the plurality of heating elements are infrared heating elements producing primarily medium-wavelength infrared energy.

9. The apparatus of claim 8 wherein the plurality of heating elements are infrared heating elements producing primarily infrared energy at a wavelength in the range of between approximately 2 microns and 4 microns.

10. The apparatus of claim 6 wherein the heating elements are infrared heating elements having internal reflectors.

11. The apparatus of claim 1 comprising additionally a vertically oriented rear heater adapted to be positioned substantially parallel with the rear surface of the seat to direct heat thereupon to remove wrinkles therefrom.

12. The apparatus of claim 11 wherein an angular position of the vertically oriented rear heater is adjustable.

13. An apparatus for removing wrinkles from a seat covering material on a seat, comprising:
a heater producing primarily medium-wavelength infrared energy and positioned so as to direct the primarily medium-wavelength infrared energy at the surface of a seat to remove wrinkles from the seat covering thereof.

14. The apparatus of claim 13 wherein the heater produces primarily infrared energy at a wavelength in the range of between approximately 2 microns and 4 microns.

15. A method for removing wrinkles from a seat covering material on a seat having a vertically oriented rear surface and a front surface having a vertically oriented back portion thereof and a horizontally oriented bottom portion thereof, comprising:
(a) positioning a vertically oriented front heater portion substantially parallel with the vertically oriented back portion of the front seat surface such that a distance between the vertically oriented entire front heater portion and the vertically oriented entire back portion of the front seat surface is substantially constant across the vertically oriented back portion of the front seat surface to direct heat thereupon to remove wrinkles therefrom; and (b) positioning a horizontally oriented front heater portion substantially parallel with the horizontally oriented bottom portion of the front seat surface such that a distance between the horizontally oriented entire front heater portion and the horizontally oriented entire bottom portion of the front seat surface is substantially constant across the horizontally oriented bottom portion of the front seat surface to direct heat thereupon to remove wrinkles therefrom, wherein the vertically oriented front heater portion and horizontally oriented front heater portion are positioned with respect to each other at an angle corresponding to an angle between the vertically oriented back portion of the front surface of the seat and the horizontally oriented bottom portion of the front surface of the seat such that the vertically oriented front heater portion and the horizontally oriented front heater portion together conform to the shape of the front surface of the seat.

16. The method of claim 15 comprising additionally positioning a bight heater between the vertically oriented front heater portion and the horizontally oriented front heater portion to direct heat upon a bight of the seat.

17. The method of claim 15 wherein the vertically and horizontally oriented front heater portions produce primarily medium-wavelength infrared energy.

18. The method of claim 17 wherein the vertically and horizontally oriented front heater portions produce primarily infrared energy at a wavelength in the range of between approximately 2 microns and 4 microns.

19. The method of claim 15 comprising additionally positioning a vertically oriented rear heater substantially parallel with the rear surface of the seat to direct heat thereupon and to remove wrinkles therefrom.

* * * * *